United States Patent [19]
Saito

[11] Patent Number: 4,995,640
[45] Date of Patent: Feb. 26, 1991

[54] MAGNETIC SENSOR ACTUATION SYSTEM SUITABLE FOR USE IN PASSIVE SEAT BELT SYSTEM

[75] Inventor: Hiroyuki Saito, Chigasaki, Japan

[73] Assignee: Nippon Seiko Kabushiki Kaisha, Tokyo, Japan

[21] Appl. No.: 536,740

[22] Filed: Jun. 12, 1990

[30] Foreign Application Priority Data

Jun. 12, 1989 [JP] Japan ............................. 1-68495[U]

[51] Int. Cl.⁵ ............................................. B60R 22/06
[52] U.S. Cl. .................................. 280/804; 180/268; 297/468
[58] Field of Search ................ 280/802, 804; 180/268; 297/468

[56] References Cited

U.S. PATENT DOCUMENTS

| 3,830,518 | 8/1974 | Silber | 280/804 |
| 3,977,696 | 8/1976 | Igeta | 280/804 |
| 4,070,040 | 1/1978 | Igeta | 280/804 |
| 4,763,750 | 8/1988 | Yoshitsugu | 280/804 |
| 4,943,087 | 7/1990 | Sasaki | 280/804 |

FOREIGN PATENT DOCUMENTS

| 3743550 | 7/1988 | Fed. Rep. of Germany . |
| 63-35868 | 9/1988 | Japan . |
| 64-9860 | 1/1989 | Japan . |

Primary Examiner—Kenneth R. Rice

[57] ABSTRACT

A magnetic sensor actuation system is disclosed, which is suitable for use in a passive seat belt system of the type that a slide anchor with a webbing carried thereon travels along a guide rail having at least one bent section. The actuation system includes at least one magnetic sensor provided near the guide rail and a magnet provided on the slide anchor to actuate the magnetic sensor. Upon actuation of the magnetic sensor, the magnet is located on a line extending between the center of turning movement of the slide anchor along the bent section of the guide rail and the midpoint of an area of contact between the slide anchor and the guide rail.

15 Claims, 21 Drawing Sheets

006
MAGNETIC SENSOR ACTUATION SYSTEM SUITABLE FOR USE IN PASSIVE SEAT BELT SYSTEM

BACKGROUND OF THE INVENTION (1) Field of the Invention:

The present invention relates to a passive seat belt system for a motor vehicle, and especially to a magnetic sensor actuation system suitable for use in a passive seat belt system of the type that a slide anchor travels along a guide rail having a bent section while dragging a webbing, said magnetic sensor actuation system featuring high reliability when a magnetic sensor for generating a warning signal or stop signal is actuated by a magnet on the slide anchor.

(2) Description of the Related Art:

To date, certain passive seat belt systems have been described where a webbing is automatically applied to an occupant at the same time as the person sits in a car seat and is hence restrained and protected safely by the webbing in the event of a vehicular accident. The construction of a guide rail portion of a passive seat belt system is shown in FIG. 1.

In the illustrated passive seat belt system, a slide anchor 14 to which one end of an occupant-restraining webbing 16 [or a buckle 13 latched with a tongue 15 at one end of the webbing 16 and releasable in the event of an emergency (which may hereinafter be called "ERB"), a tongue 15 latched in the ERB 13 attached to the webbing 16, or the like] is attached is caused to travel on a guide rail 5 in the direction of the length of the vehicle along a roofside 2. The slide anchor 14 is movable between both ends of the guide rail 5. By the movement of the slide anchor 14, the webbing 16 is carried away from or toward an associated occupant seat so that a space is formed to allow the occupant to enter or egress from the vehicle and the webbing 16 is automatically applied to the occupant after he sits in the occupant seat.

A magnet disposed in a magnet casing on the slide anchor 14 actuates magnetic sensors 6–12 attached near the guide rail 5 at desired positions between both the ends of the guide rail 5, thereby generating signals each of which is used as an anchor stop signal, a passing signal or a warning signal.

FIG. 21(a) shows a first example of a conventional magnetic sensor actuation system. FIG. 21(b) is a cross-sectional view taken in the direction of arrows XXI(b)—XXI(b) of FIG. 21(a).

The ERB 13 is attached to the slide anchor 14 which travels on and along the guide rail 5. A tongue 15 to which a webbing 16 is fastened at one end thereof can be latched in the ERB 13. The ERB 13 is also formed as a magnet casing 26, so that a magnet 18 is received therein while being supported by a spring 19. When the tongue 15 is inserted into and latched with the ERB 13, the spring 19 is compressed to bring the magnet 18 closer to the guide rail 5, whereby the magnetic sensor 6 is actuated.

The slide anchor 14 must be able to travel past a sharpest bent section of the guide rail 5 when the slide anchor 15 moves on and along the guide rail 5. It is thus necessary to design the configuration of the magnet casing 26 in such a way that the casing 26 does not interfere with the guide rail 5 or a trim 20 even at the most sharply bent section. In the case of this example, both corners are cut away to minimum necessary extent as indicated at b. Inside the magnet casing 26, the magnet 18 is positioned as closely as possible to the trim 20 as indicated by a clearance c.

Nevertheless, the magnet 18 is located unduly remotely from the guide rail 5 at a position where the magnetic sensor 6 is supposed to be actuated. Although this position is at a straight section of the guide rail 5 in the drawing, the same problem also arises where the section has only a gentle bend. Obviously, the distance between the magnetic sensor 6 attached near the guide rail 5 and the magnet 18 becomes substantially greater as indicated by d.

One example of such magnetic sensor actuation systems is disclosed in Offenlegungsschrift (W. German Patent Publication No.) 37 43 550A1.

A second example of a conventional magnetic sensor actuation system is illustrated in FIG. 22(a). FIG. 22(b) is a cross-sectional view taken in the direction of arrows XXII(b)—XXII(b) of FIG. 22(a).

This second example is identical to the first (FIG. 21) except for the configuration of a magnet casing 26. The magnet casing 26 is rectangular. Without cutting away both corners, the magnet casing 26 is arranged away in toto from the guide rail 5 so that corners b come most closely to the trim 20 at the most sharply bent section of the guide rail 5.

Despite the design permitting the magnet 18 to come closest to the trim 20 when at the sharpest section of the guide rail 5, where the distance between the magnet 18 and the trim 20 is reduced approximately to c, the distance becomes greatest at the straight section as indicated by d.

In a magnetic sensor actuation system of the type where a magnetic sensor provided near a guide rail is actuated by a magnet on a slide anchor, a magnet casing tends to interfere with the guide rail or trim at the most sharply bent section of the guide rail as described above. To overcome this problem, it is necessary to cut away portions of the magnet casing where such portions may interfere with the guide rail or trim.

The determination of the configuration of the magnet casing on the basis of the most sharply bent section may however result in a large distance between the magnet and the magnet sensor depending on the position of arrangement of the magnet when one wants to arrange the magnetic sensor at a straight section or at a gently bent section for actuation at that point. As a result, it becomes difficult to control the magnetic force which reaches the magnetic sensor, so the magnetic sensor may be accidentally actuated, for example, by a shock or under the influence of an external magnetic body.

To cope with the above problem, use of a larger magnet, an increase of the magnetic force and/or enhancement of the sensitivity of each magnetic sensor could be considered. Both size and cost reductions are however desired for such magnets and magnetic sensors, and there are also physical limitations to the degree of such modifications. In practice it is therefore difficult to adopt this method.

SUMMARY OF THE INVENTION

An object of the present invention is therefore to provide a magnetic sensor actuation system which can solve the problems described above and, using simple construction, can actuate a magnetic sensor without failure.

In one aspect of the present invention, there is thus provided a magnetic sensor actuation system suitable for use in a passive seat belt system of the type that a slide anchor with a webbing carried thereon travels along a guide rail having at least one bent section. The actuation system comprises at least one magnetic sensor provided near the guide rail and a magnet provided on the slide anchor to actuate the magnetic sensor. Upon actuation of the magnetic sensor, the magnet is located on a line extending between the center of turning movement of the slide anchor along the bent section of the guide rail and the midpoint of an area of contact between the slide anchor and the guide rail.

In the magnetic sensor actuation system according to the present invention, the magnet is so located that the distance between a magnet casing on the slide anchor and the guide rail or a trim remains substantially unchanged regardless of the position of slide anchor in relation to any part of a straight or bent section of the guide rail. It is hence possible to put the magnet in closer proximity to the magnetic sensor. Because the magnetic sensor is actuated by the magnet brought to such a position, the reliability of actuation of the magnetic sensor has been improved.

Described specifically, the magnetic sensor actuation system of the present invention can bring about the following advantages:

(1) Since the magnet is put in closer proximity to the magnetic sensor, it can actuate the magnetic sensor reliably even if its magnetic force is small.

(2) The distance between the magnet and the magnetic sensor is reduced, so that the magnet can actuate the magnetic sensor without failure even if its size is small.

(3) The distance between the magnet and the magnetic sensor is reduced, whereby the magnetic sensor can be actuated without failure even if it has low sensitivity.

(4) Sufficient magnetic force reaches the magnetic sensor, whereby the operation of the magnetic sensor is stable.

(5) Because of the stable operation of the magnetic sensor, occurrence of shock-induced malfunction is minimized, permitting increased design tolerance for all peripheral parts.

(6) The stable operation of the magnetic sensor has made it possible to minimize malfunction under the influence of surrounding magnetic members.

(7) The magnetic sensor actuation system can fully retain its function even if the performance of the magnetic sensor and/or magnet is reduced, the magnet is made smaller, or the dimensional accuracy of all the peripheral parts is reduced.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
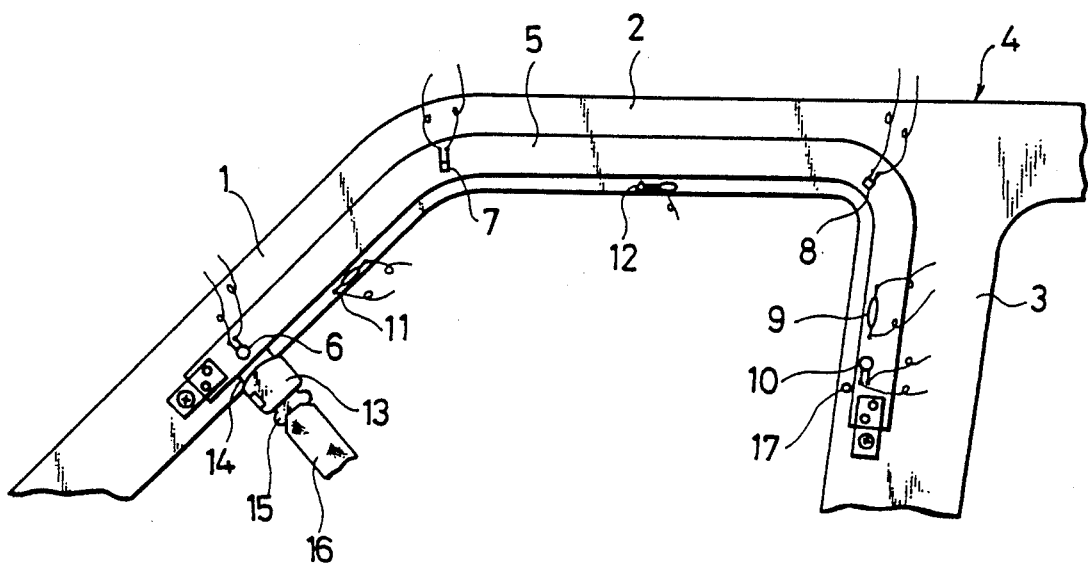
FIG. 1 is a fragmentary schematic front view of a passive seat belt system, which illustrates a guide rail and some components and parts associated with the guide rail.

FIG. 1 is a fragmentary schematic illustration of a passive seat belt system. Although the passive seat belt system has already been described in relation to the conventional examples, it will be described again as it includes some elements which constitute certain prerequisites for the individual embodiments of this invention.

In the vicinity of the guide rail 5 which extends along front pillar 1, roofside 2 and center pillar 3 in the direction of the length of a vehicle body 4, there are arranged the magnetic sensors 6, 7, 8, 9, 10, 11 and 12. The buckle 13 to which the webbing 16 is fastened releasably in the event of a vehicular emergency is attached to the slide anchor 14. The slide anchor 14 is in releasable engagement with the guide rail 5.

Usually, the tongue 15 fastened to one end of the webbing 16 is in latching engagement with the buckle 13. As the slide anchor 14 slides on and along the guide rail 5, the buckle 14, tongue 15 and webbing 13 are caused to move as integral elements between both end portions of the guide rail 5. In the proximity of one of the end portions of the guide rail 5, said one end portion being on the side of the center pillar 3, a stopper 17, another latching mechanism or the like is provided to hold the slide anchor 14 while an occupant is restrained in the associated seat.

Figure 2A:
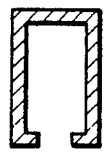
FIG. 2(a) through FIG. 2(c) are transverse crosssectional views of guide rails having different crosssectional shapes.
Figure 2B:
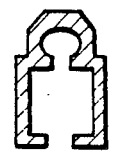
Figure 2C:
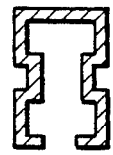

The guide rail 5 can have any cross-sectional shape. Cross-sectional shapes shown in FIGS. 2(a), 2(b) and 2(c) can be contemplated by way of example.

FIG. 3 illustrates a magnetic sensor actuation system according to a first embodiment of the present invention. The magnetic sensor actuation system of the first embodiment is shown with its tongue unlatched.

Figure 21A:
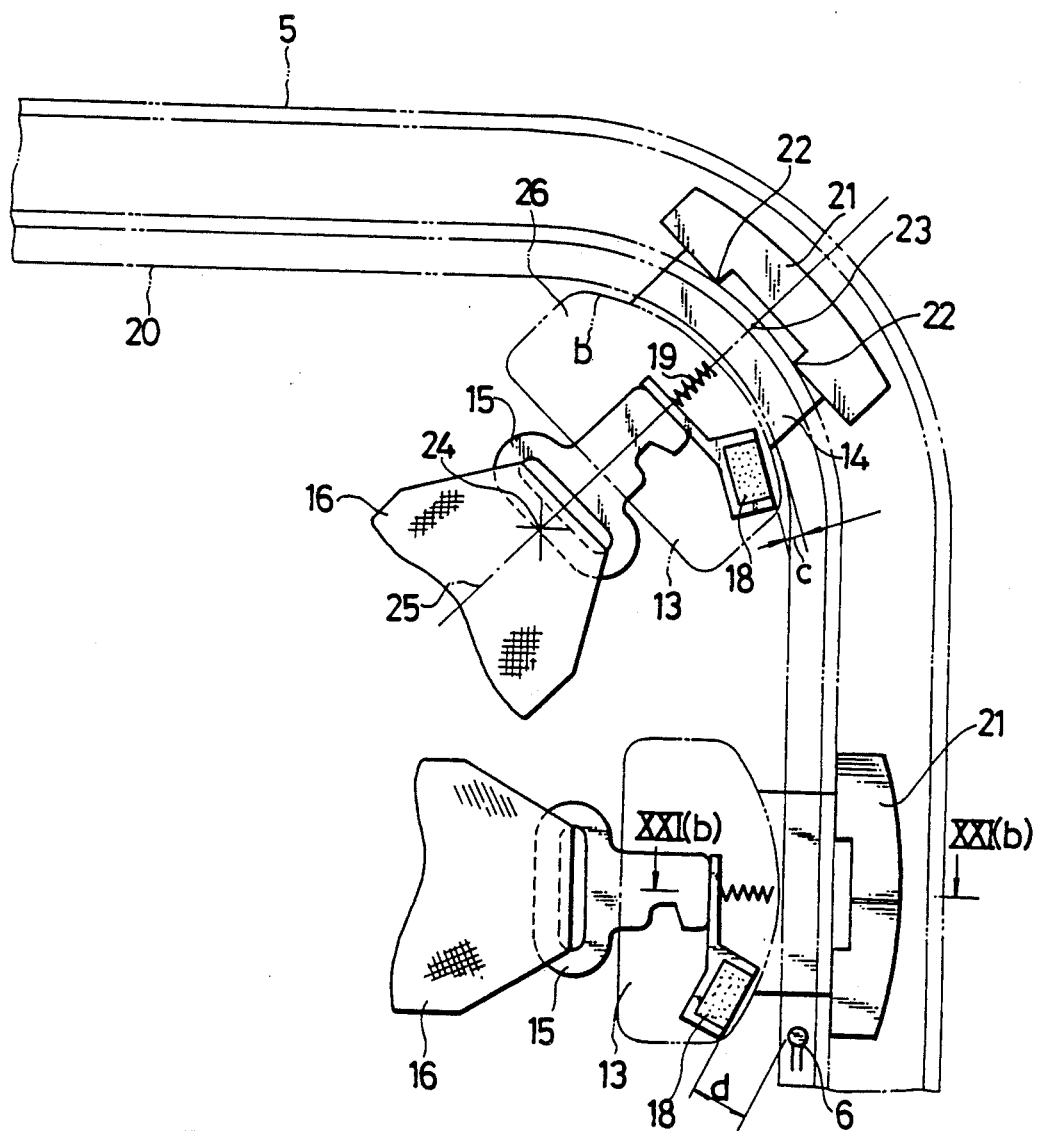
FIG. 21(a) depicts a first example of a conventional magnetic sensor actuation system.
Figure 21B:
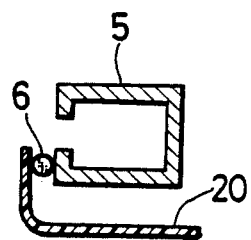
FIG. 21(b) is a cross-sectional view taken in the direction of arrows XXI(b)—XXI(b) of FIG. 21(a)
Figure 22A:
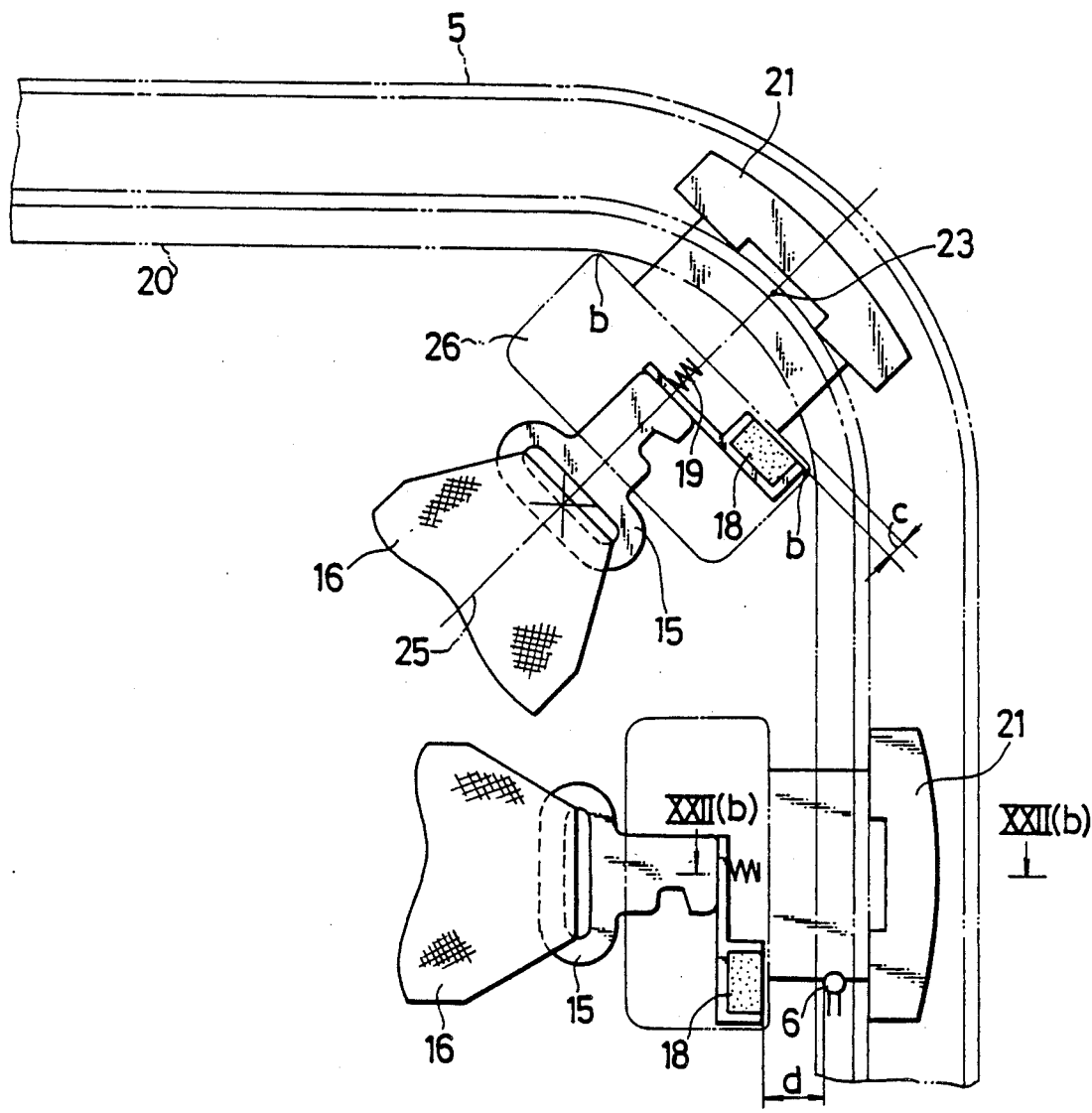
FIG. 22(a) illustrates a second example of a conventional magnetic sensor actuation system.
Figure 22B:
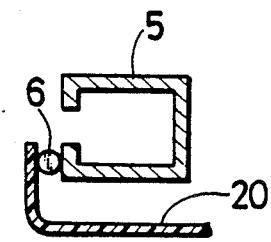
FIG. 22(b) is a cross-sectional view taken in the direction of arrows XXII(b)—XXII(b) of FIG. 22(a)

The configuration of the magnet casing 26 is designed not to interfere with a sharp bent section of the guide rail 5 or the trim 20. In the case of this embodiment, the magnet casing 26 is cut away at corner portions c to minimum necessary extent. The construction of this embodiment is substantially the same as the conventional example of FIG. 21 except for the positions and configurations of magnet 18, spring and magnetic sensor 6.

The magnet 18 is arranged to assume a position on a line 25 which extends between a center 24 of turning movement of the slide anchor 14 and a midpoint 23 of areas of contact between a sliding portion 21 and a guide rail 5. The term "the center of turning movement of a slide anchor" means the center of turning movement of the slide anchor 14 when the advancing direction of the slide anchor 14 changes at the bent, i.e., curved section of the guide rail 5. Where the curved section of the guide rail 5 is an arc of a circle, the center of turning movement is the same as the center of the circle. Where the curved section of the guide rail 5 is not an arc of a circle, for example, is a section of the curve of an exponential function or a logarithmic function, the center of turning movement does not remain at a fixed position but varies depending on the position of the slide anchor 14. The term "the midpoint of areas of contact between a sliding portion and a guide rail" means the point 23 dividing into equal halves the line segment that extends between points P and Q where the slide anchor 14 contacts the curved section of the guide rail 15.

Figure 3A:
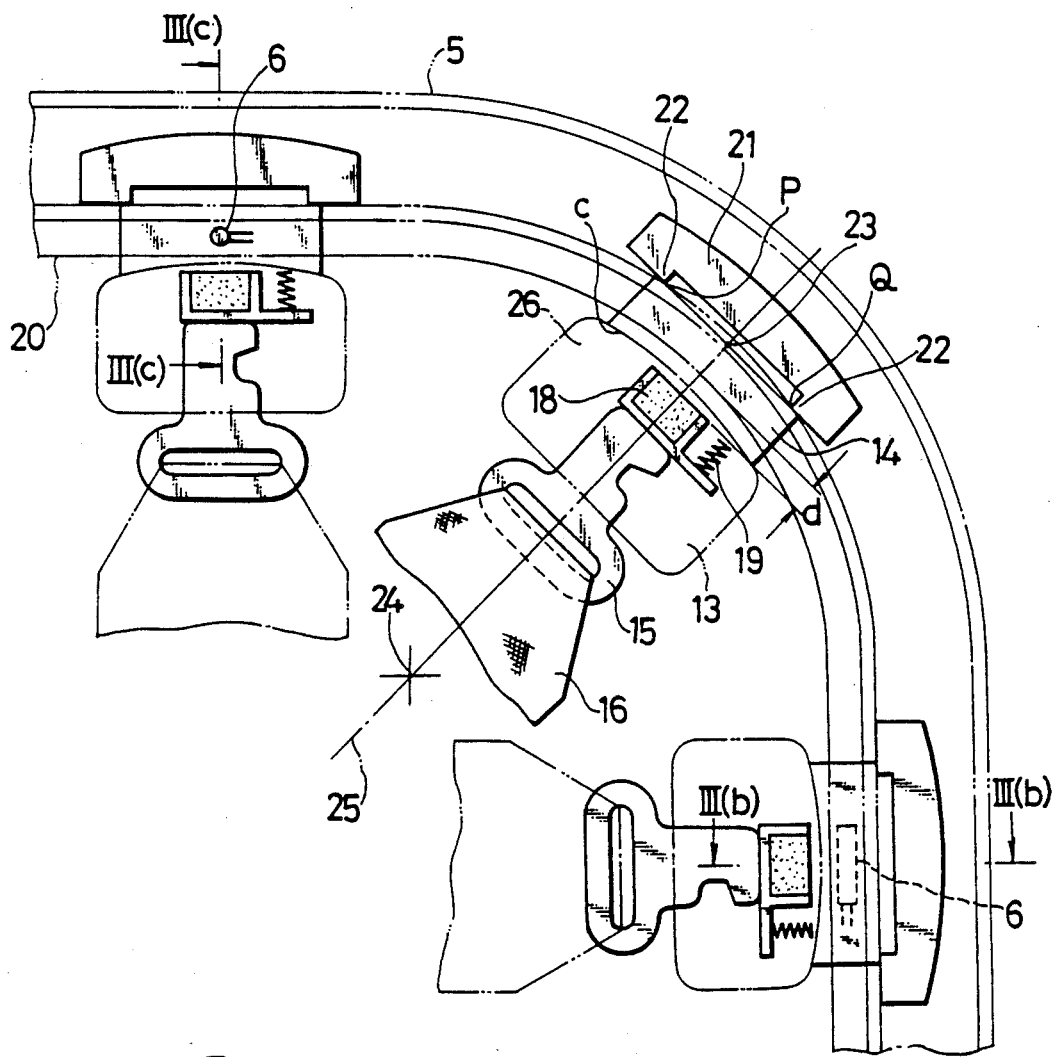
FIG. 3(a) shows a magnetic sensor actuation system according to a first embodiment of the present invention.
Figure 4A:
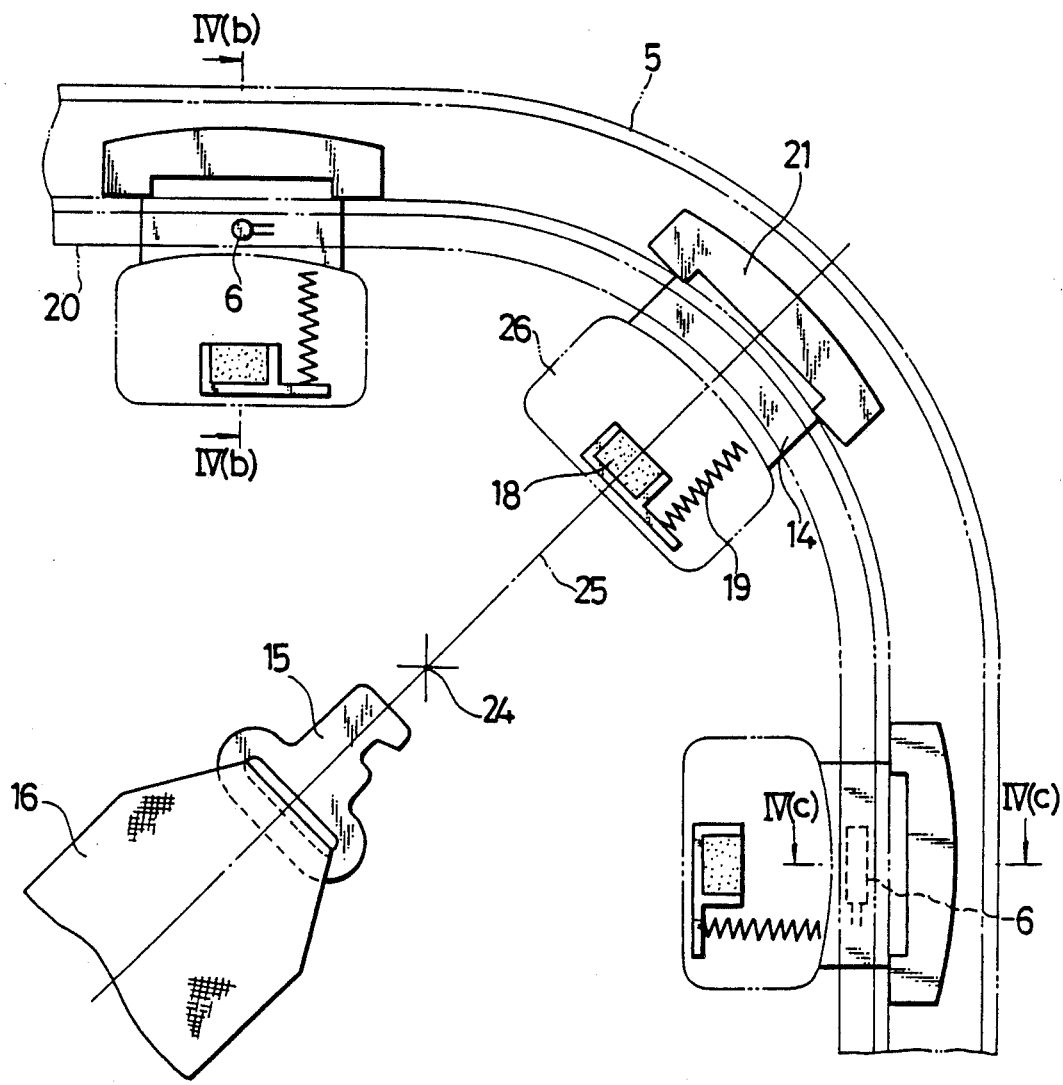
FIG. 4(a) is similar to FIG. 3(a) except that a tongue is out of latching engagement with a buckle.

The magnet 18 is movable in the buckle 13 between a first position shown in FIG. 3(a) and a second position depicted in FIG. 4(a). The tongue 15 is latched in the buckle 13 at the first position, but the tongue 15 is out of latching engagement with the buckle 13 at the second position.

The magnet 18 is arranged to approach the trim 20 as closely as possible in the magnet casing 26 as indicated by a clearance d in FIG. 3(a) when the magnet 18 is at the first position, because it is desired for stable operation that the magnet 18 be brought as closely as possible to the guide rail 5.

By arranging the magnet 18 at such a position, the magnet 18 is allowed to approach a point only a short distance away from the magnetic sensor 6 at the position where the magnet 18 is supposed to actuate the magnetic sensor 6. This is also true when the magnetic sensor 6 is arranged near a gentle curve section of the guide rail although the magnetic sensor 6 is located at a straight section of the guide rail 5 in FIGS. 3(a) and 4(a).

The magnetic sensor 6 can be arranged at any position as long as it is located in the vicinity of the guide rail 5. The closer to the magnet 18, the better. As the difference between the distance from the magnet 18 to the magnetic sensor in the state of FIG. 3(a) in which the tongue 15 is latched and the corresponding distance in the state of FIG. 4(a) in which the tongue is unlatched becomes greater, the magnetic sensor 6 can operate more stably and hence is less affected adversely by external magnetic fields.

No particular limitation is imposed on the type of the magnetic sensor 6. The following magnetic sensors can be used.

(a) Reed switch (of the type that is turned on, turned off, or switched over when a magnet is put closely to the reed switch).

(b) MR (magnetic resistance) element, whose resistance varies depending on the magnetic field strength of each magnet.

(c) Hall element, which is a semiconductor device whose output voltage varies depending on the magnetic field strength of each magnet.

(d) Contactless switch (for example, of the type that a reed switch is merely incorporated or a circuit is formed by a bias magnet).

(e) Other magnetic sensors.

Figure 3B:
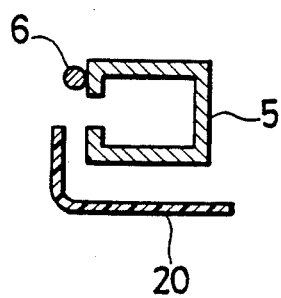
FIGS. 3(b) and 3(c) are cross-sectional views taken in the directions of arrows III(b)—III(b) and arrows III(c)—III(c) of FIG. 3(a), respectively.
Figure 3C:
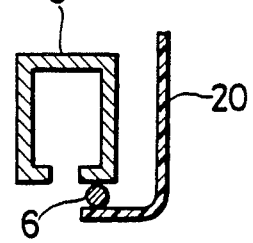

In the case of the construction shown in FIGS. 3(a) through 3(c), an output signal of the magnetic sensor 6 can be used as a warning signal to indicate the existence or absence of the tongue 15, namely that the webbing 16 is not connected to the slide anchor 14.

Figure 5A:
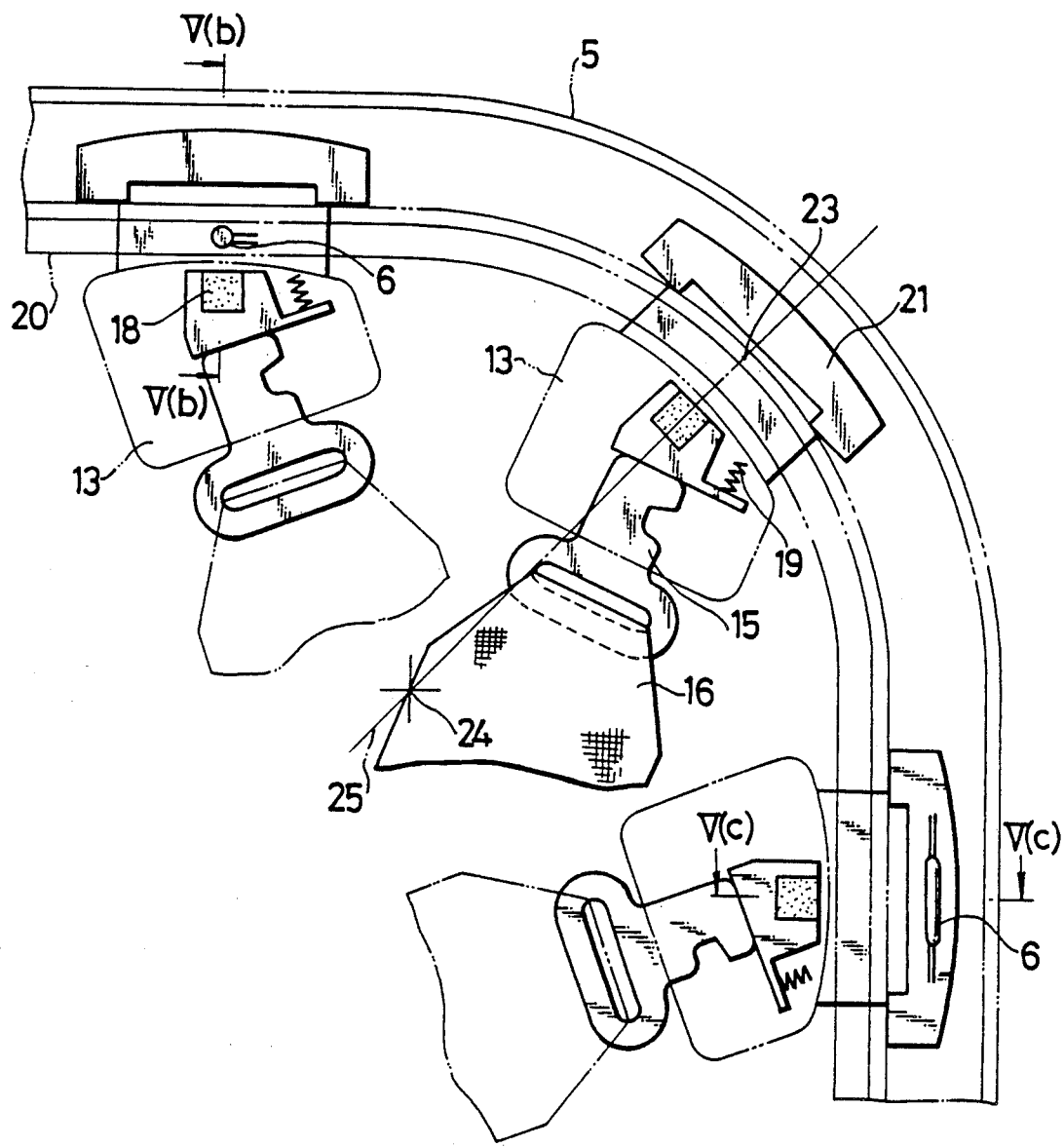
FIG. 5(a) shows a magnetic sensor actuation system according to a second embodiment of the present invention.
Figure 5B:
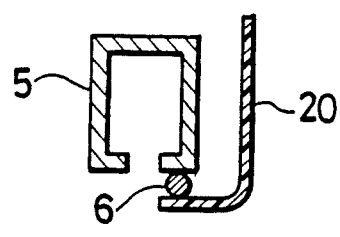
FIGS. 5(b) and 5(c) are cross-sectional views taken in the directions of arrows V(b)—V(b) and arrows V(c)—V(c) of FIG. 5(a), respectively.
Figure 5C:
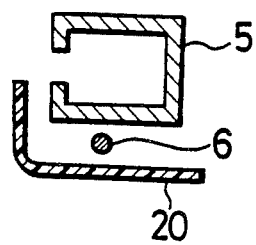
Figure 6A:
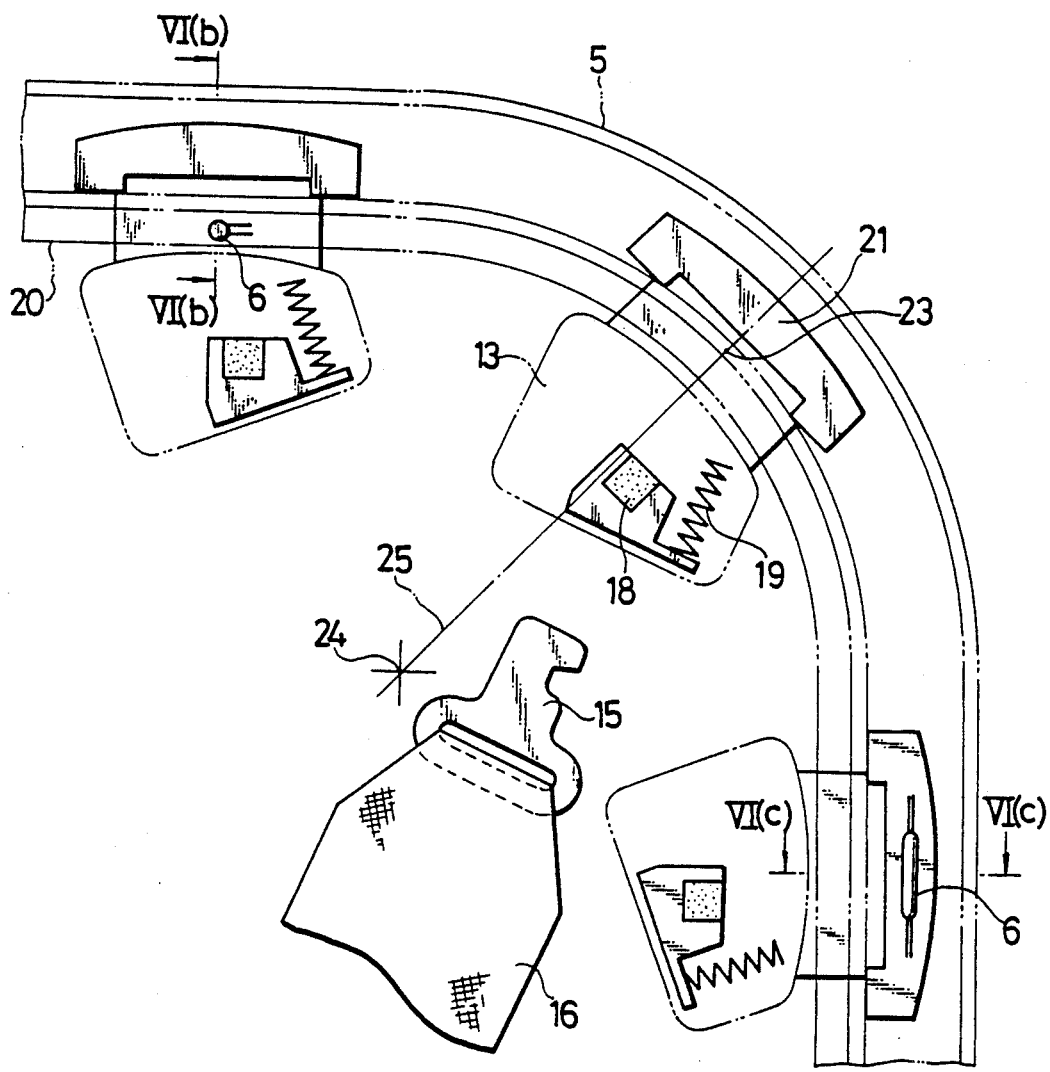
FIG. 6(a) is similar to FIG. 5(a) except that a tongue is out of latching engagement with a buckle.
Figure 6B:
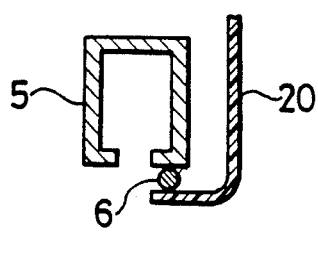
FIGS. 6(b) and 6(c) are cross-sectional views taken in the directions of arrows VI(b)—VI(b) and arrows VI(c)—VI(c) of FIG. 6(a), respectively.
Figure 6C:
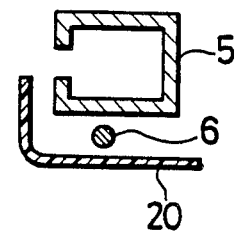

FIGS. 5(a) through 5(c) show a magnetic sensor actuation system according to a second embodiment of the present invention, while FIGS. 6(a) through 6(c) illustrate the magnetic sensor actuation system of the second embodiment in an unlatched state.

Although the basic construction is the same as the first embodiment, the tongue-inserting slot of an ERB 13 extends somewhat downward. As will become apparent from a comparison between FIG. 5(a) and FIG. 6(a), a magnet 18 also moves somewhat downward.

Figure 4B:
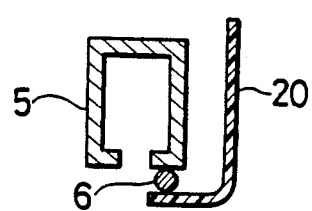
FIGS. 4(b) and 4(c) are cross-sectional views taken in the directions of arrows IV(b)—IV(b) and arrows IV(c)—IV(c) of FIG. 4(a), respectively.
Figure 4C:
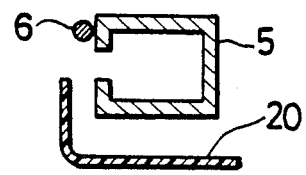

The second embodiment is different from the first embodiment of FIGS. 4(a) through 4(c) in that when the tongue is unlatched, the magnet 18 is not located on the line 25 which extends between the center 24 of turning movement of the slide anchor and the midpoint 23 of the areas of contact between the slide anchor and the guide rail. It is sufficient as long as this condition is satisfied when actuation of the magnetic sensor 6 is desired.

Figure 7A:
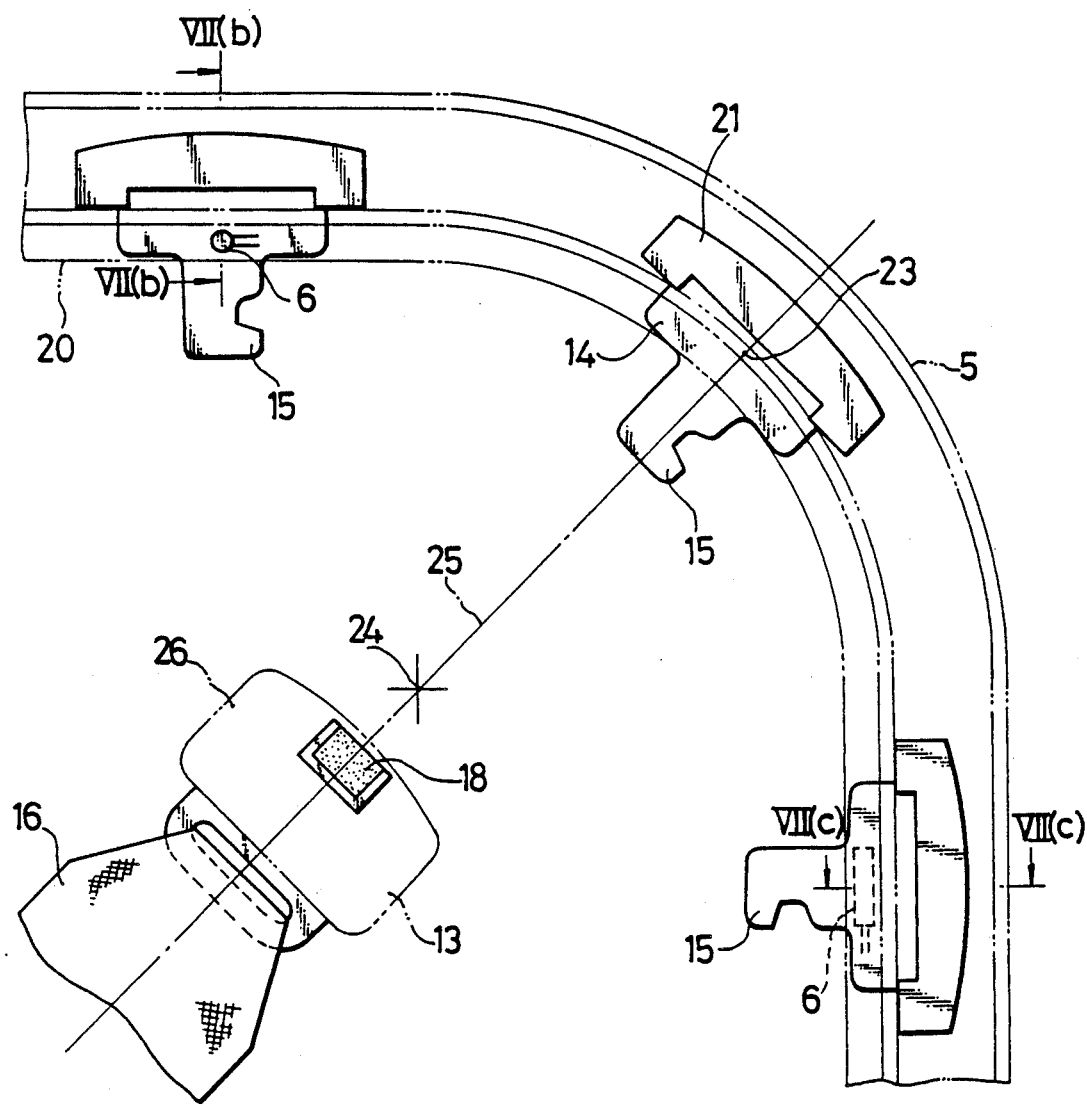
FIG. 7(a) shows a magnetic sensor actuation system according to a third embodiment of the present invention.
Figure 7B:
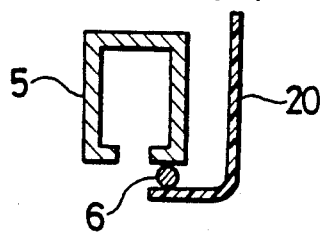
FIGS. 7(b) and 7(c) are cross-sectional views taken in the directions of arrows VII(b)—VII(b) and arrows VII(c)—VII(c) of FIG. 7(a), respectively.
Figure 7C:
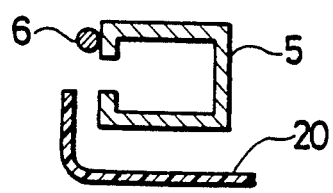
Figure 8A:
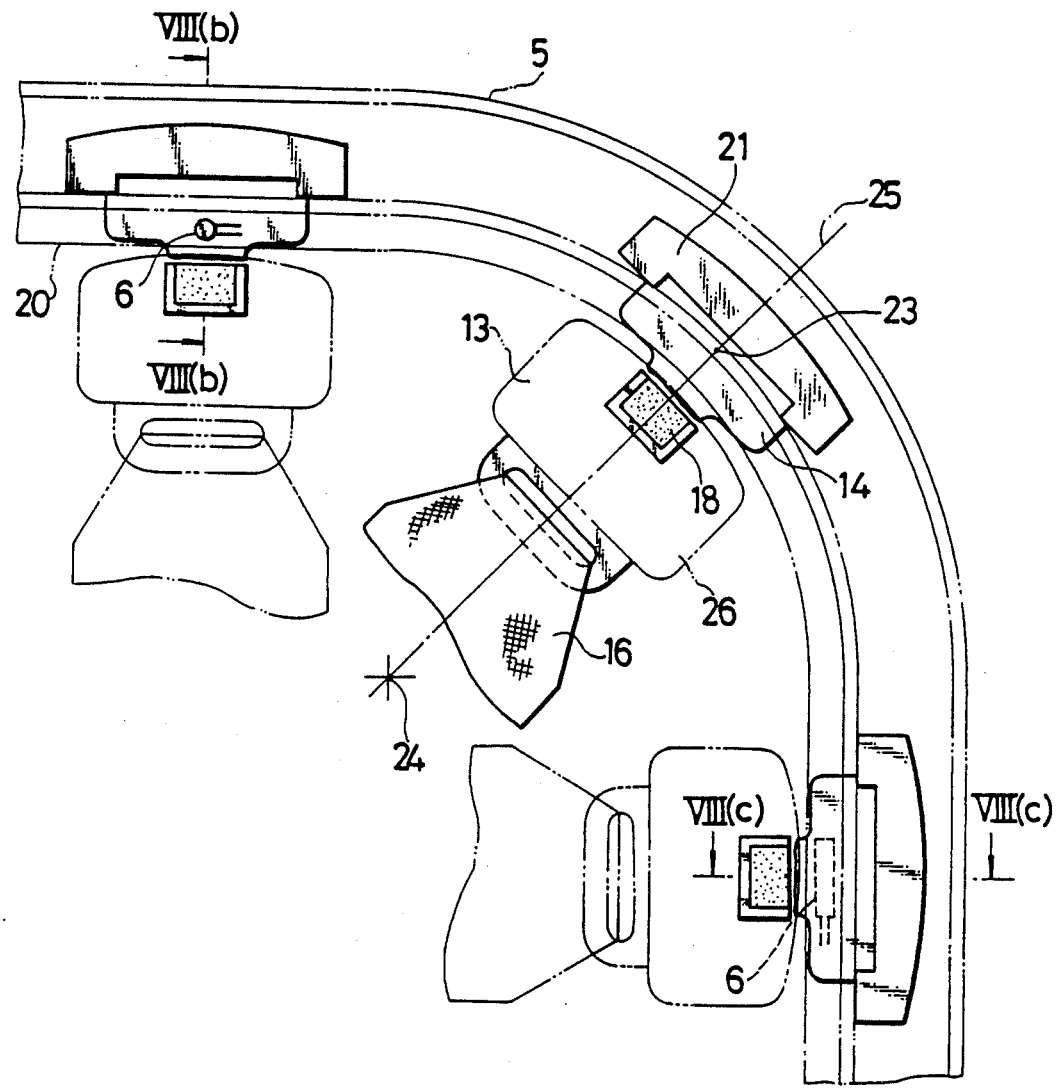
FIG. 8(a) is similar to FIG. 7(a) except that a tongue is in latching engagement with a buckle.
Figure 8B:
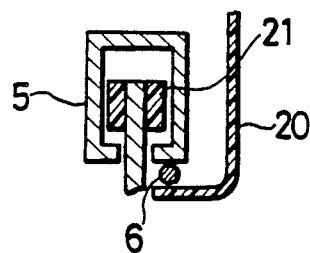
FIGS. 8(b) and 8(c) are cross-sectional views taken in the directions of arrows VIII(b)—VIII(b) and arrows VIII(c)—VIII(c) of FIG. 8(a), respectively.
Figure 8C:
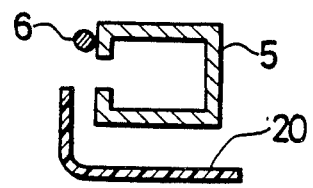

FIGS. 7(a) through 7(c) illustrate a magnetic sensor actuation system according to a third embodiment of the present invention, in which a tongue 15 is unlatched. FIGS. 8(a) through 8(c) are similar to FIGS. 7(a) through 7(c) except that the tongue is latched. To facilitate reading of these drawings, a free end portion of the tongue 15 is omitted. In the third embodiment, the tongue 15 is provided on the side of the slide anchor 14 and an ERB 13 is arranged on the side of the webbing 16. A magnet 18 is preferably fixed at a predetermined position of the ERB 13.

Figure 9A:
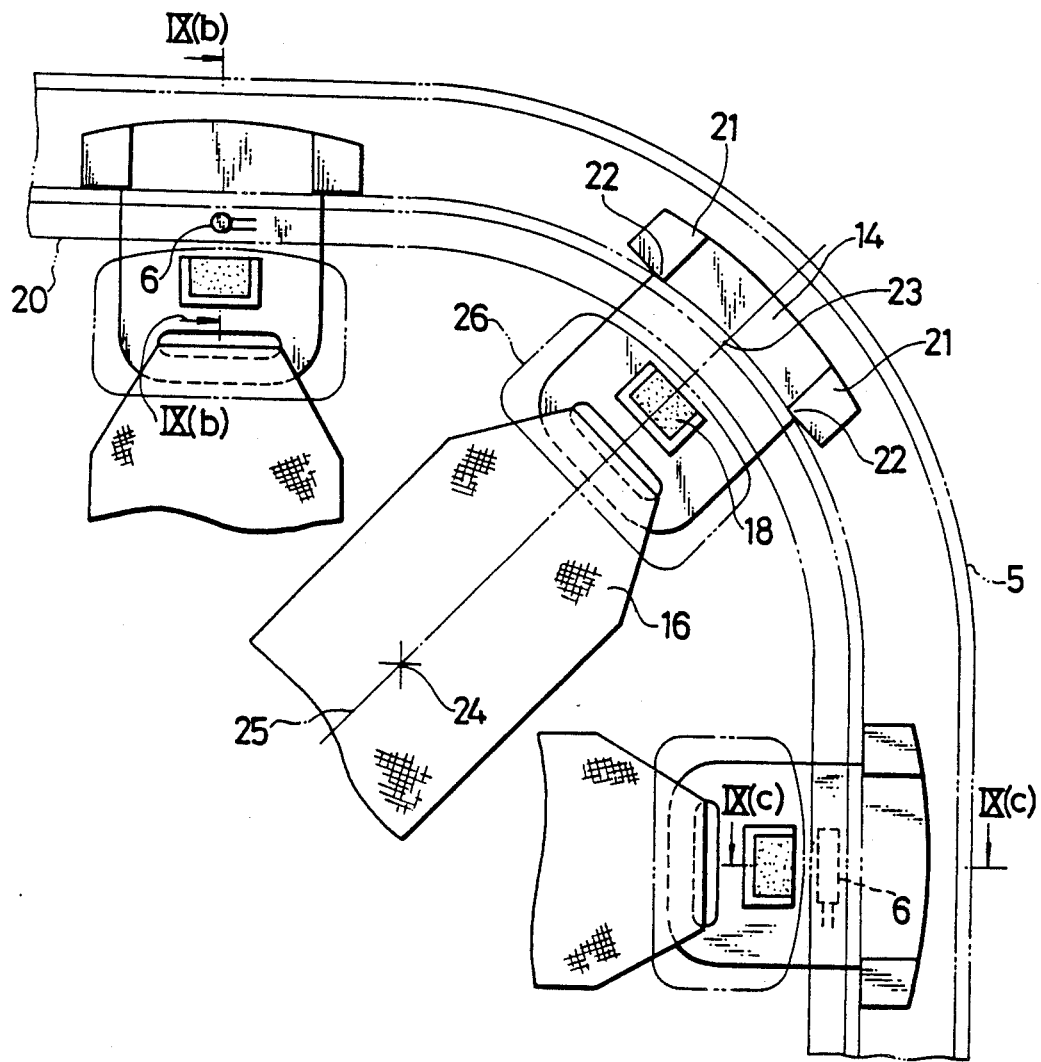
FIG. 9(a) shows a magnetic sensor actuation system according to a fourth embodiment of the present invention.
Figure 9B:
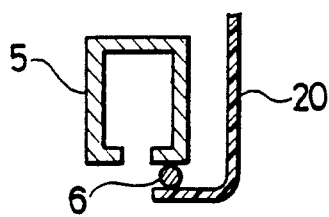
FIGS. 9(b) and 9(c) are cross-sectional views taken in the directions of arrows IX(b)—IX(b) and arrows IX(c)—IX(c) of FIG. 9(a), respectively.
Figure 9C:
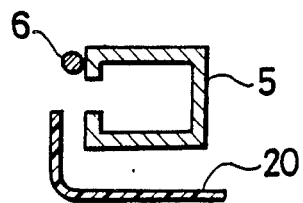

FIGS. 9(a) through 9(c) show a magnetic sensor actuation system according to a fourth embodiment of the present invention. This embodiment is not of the ERB type as in the first to third embodiments depicted in FIGS. 3(a) through FIG. 8(c) but is of the type that a webbing is directly sewn on a slide anchor. The configuration of a sliding portion 21 is also different from that of the sliding portion in the first to third embodiments.

Figure 10A:
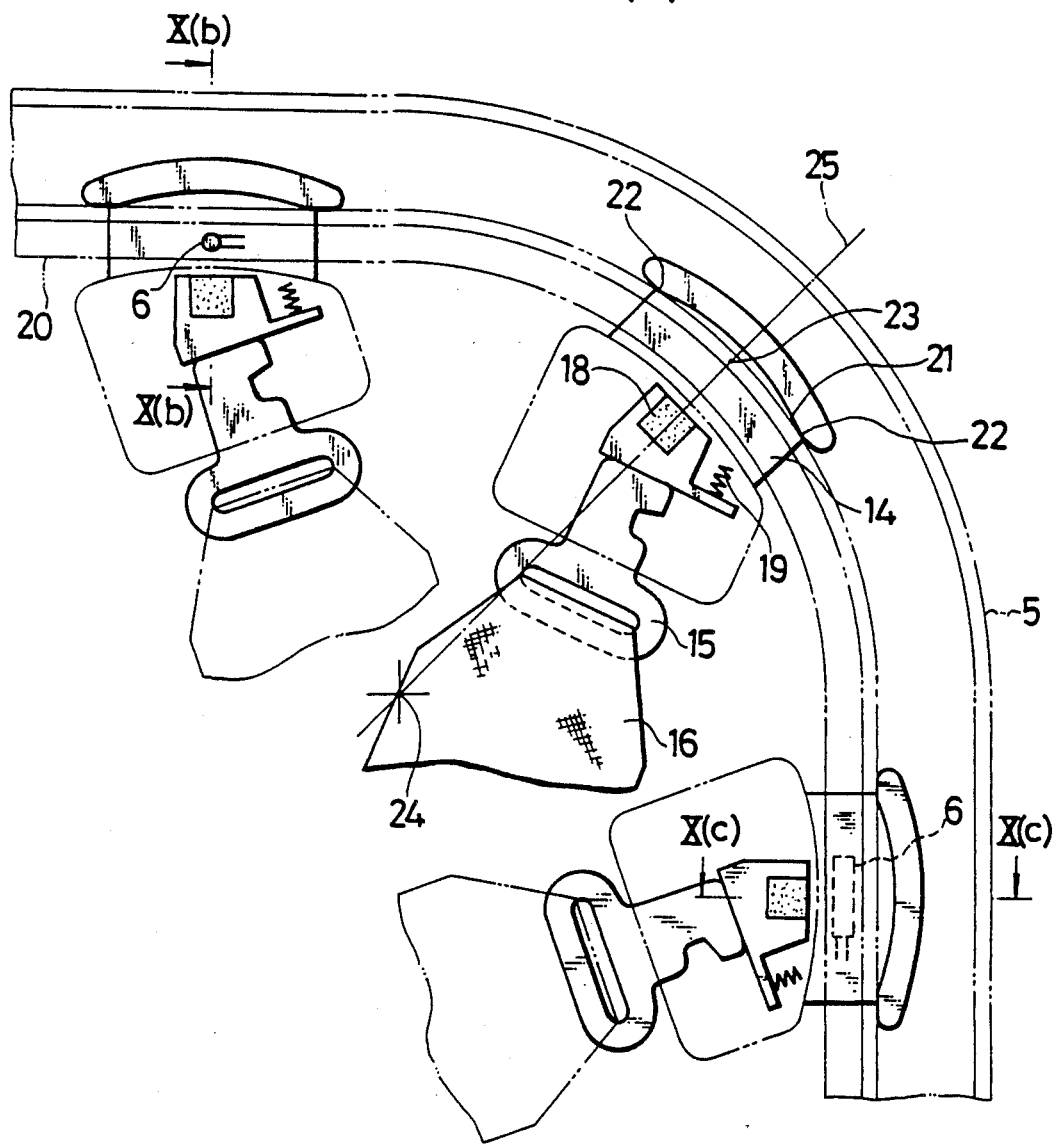
FIG. 10(a) shows a magnetic sensor actuation system according to a fifth embodiment of the present invention.
Figure 10B:
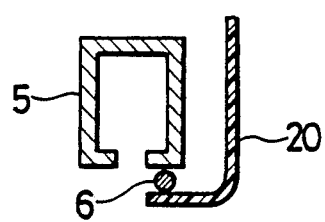
FIGS. 10(b) and 10(c) are cross-sectional views taken in the directions of arrows X(b)—X(b) and arrows X(c)—X(c) of FIG. 10(a), respectively.
Figure 10C:
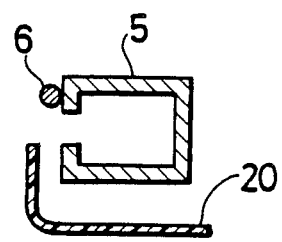

FIGS. 10(a) through 10(c) depicts a magnetic sensor actuation system according to a fifth embodiment of the present invention. This embodiment is different from the second embodiment only in the configuration of a sliding portion 21 of the slide anchor 14. The slide anchor 14 also contacts at two points P,Q with the curved section of the guide rail 15 in this embodiment.

Figure 11A:
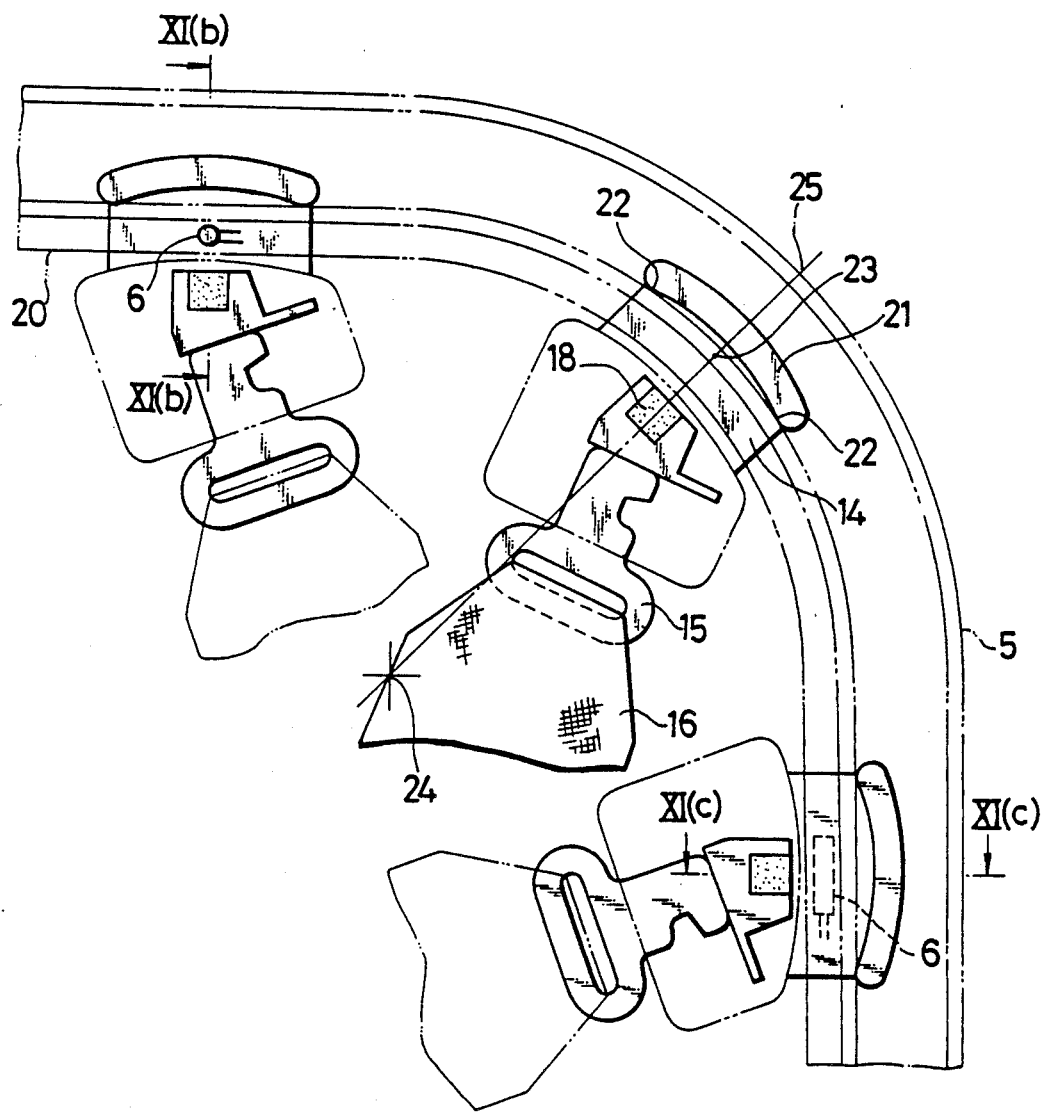
FIG. 11(a) shows a magnetic sensor actuation system according to a sixth embodiment of the present invention.
Figure 11B:
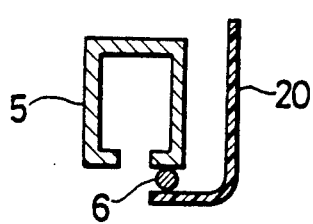
FIGS. 11(b) and 11(c) are cross-sectional views taken in the directions of arrows XI(b)—XI(b) and arrows XI(c)—XI(c) of FIG. 11(a), respectively.
Figure 11C:
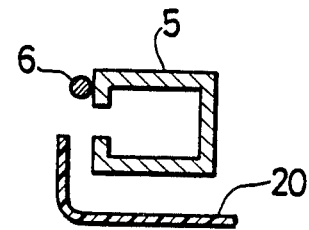

FIGS. 11(a) through 11(c) show a magnetic sensor actuation system according to a sixth embodiment of the present invention. This embodiment is also different from the second embodiment only in the configuration of a sliding portion 21 of the slide anchor 14.

Figure 12:
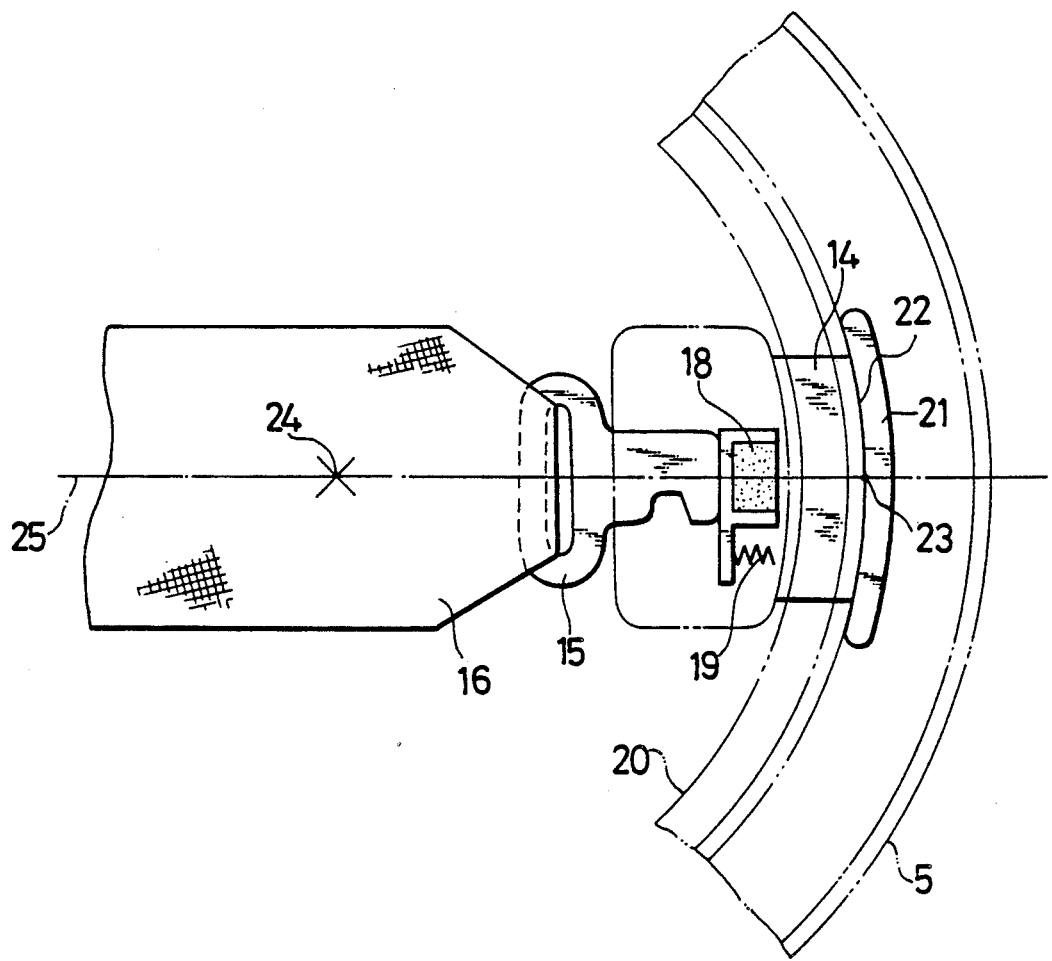
FIG. 12 shows a magnetic sensor actuation system according to a seventh embodiment of the present invention.

FIG. 12 illustrates a magnetic sensor actuation system according to a seventh embodiment of the present invention. This embodiment is different from the first embodiment only in the configuration of a sliding portion of the slide anchor 14. In this embodiment, the sliding portion 21 of the slide anchor 14 is in contact with the guide rail 5 over the entire length of the sliding portion 21. In this embodiment, the "midpoint of the area of contact between the sliding portion and the guide rail" is the point 23 which divides into equal halves the area of contact over the entire length of the sliding portion (i.e., a curve of a predetermined length).

Figure 13:
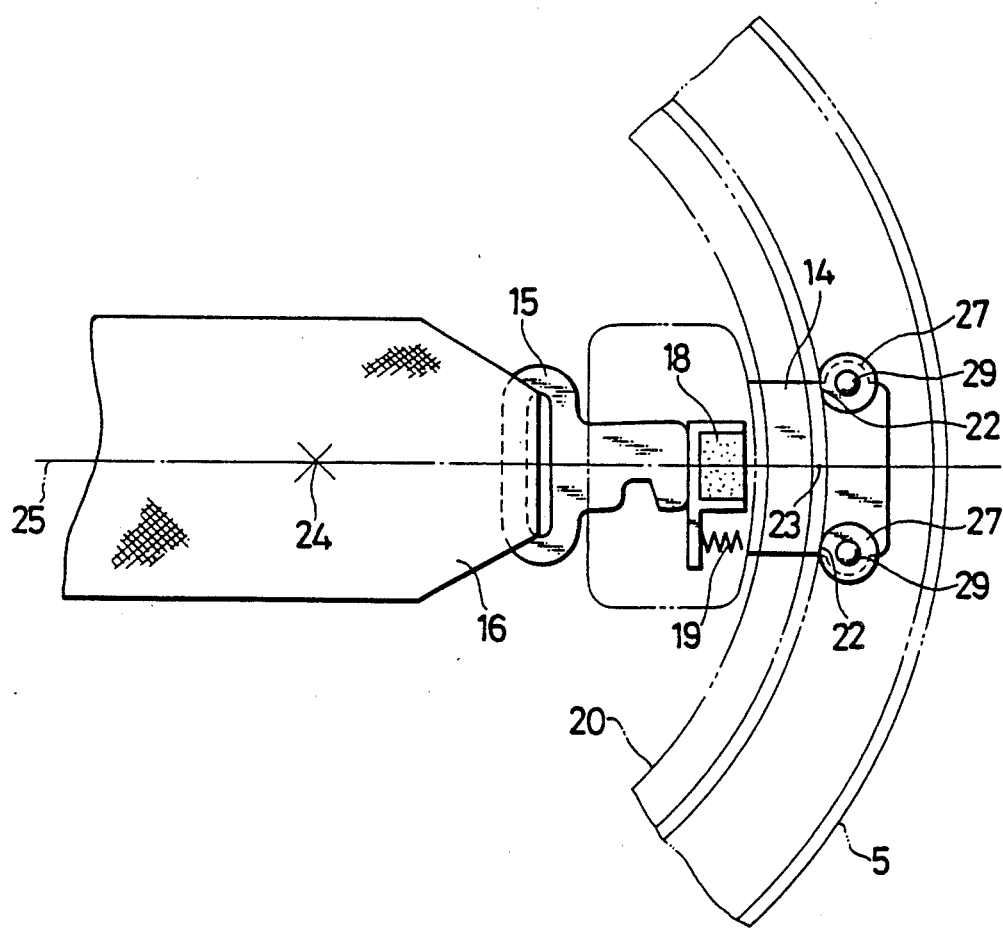
FIG. 13 shows a magnetic sensor actuation system according to an eighth embodiment of the present invention.

FIG. 13 is a magnetic sensor actuation system according to an eighth embodiment of the present invention. This embodiment is different from the first embodiment in that the slide anchor 14 and the guide rail 5 undergo sliding contact in the first embodiment but the slide anchor 14 contacts the guide rail 5 by way of rollers 27,27.

FIGS. 14(a) through 14(d) depict a magnetic sensor actuation system according to a ninth embodiment of the present invention. In this embodiment, a webbing anchor portion 28 is of the pivotal type. A magnet 18 is arranged to remain on a line 25 even when the webbing anchor portion 28 pivots. A pin 29 about which the webbing anchor portion 28 pivots is located substantially on the line 25. The magnet 18 has an arcuate configuration and is arranged about the pin 29, i.e., about the pivot of the webbing anchor portion and on the side of the guide rail.

Figure 14A:
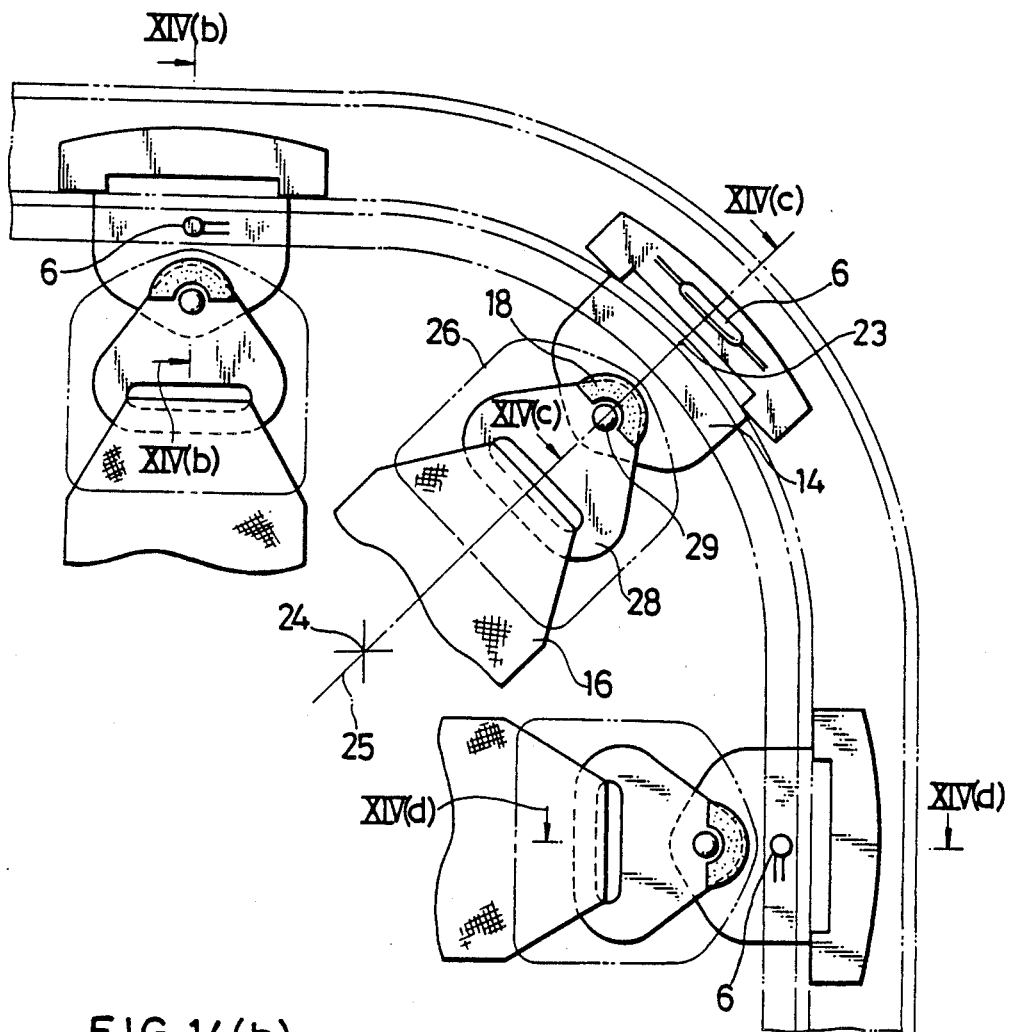
FIG. 14(a) shows a magnetic sensor actuation system according to a ninth embodiment of the present invention.
Figure 14B:
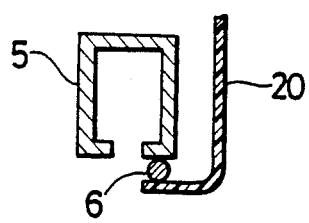
FIGS. 14(b) through 14(d) are cross-sectional views taken in the directions of arrows XIV(b)—XIV(b), XIV(c)—XIV(c) and XIV(d)—XIV(d) of FIG. 14(a), respectively.
Figure 14C:
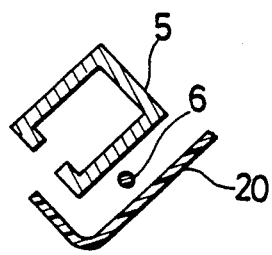
Figure 14D:
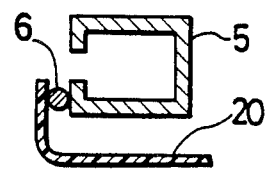
Figure 15:
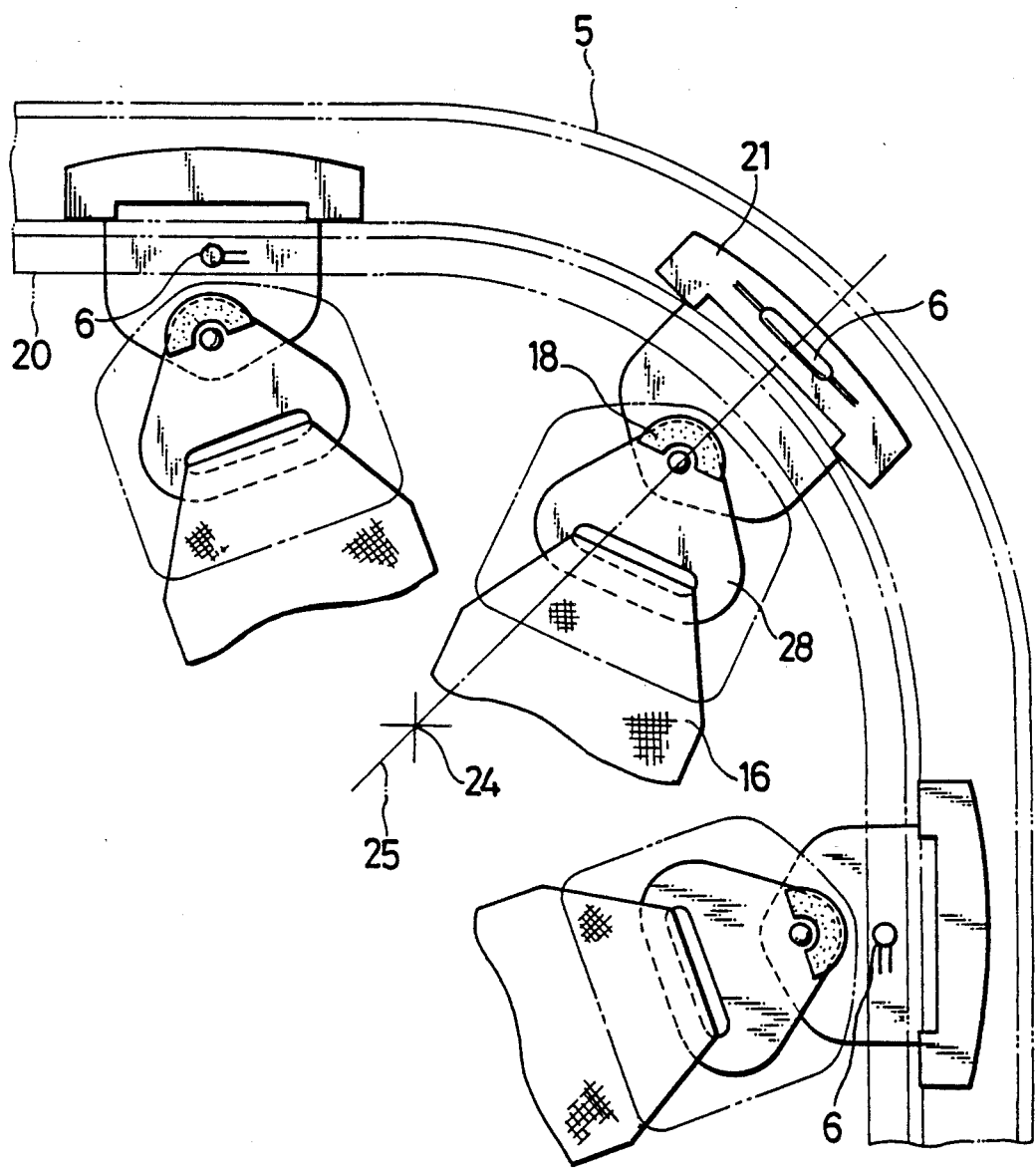
FIG. 15 is similar to FIG. 14(a) except that a tongue has been pivoted.
Figure 16:
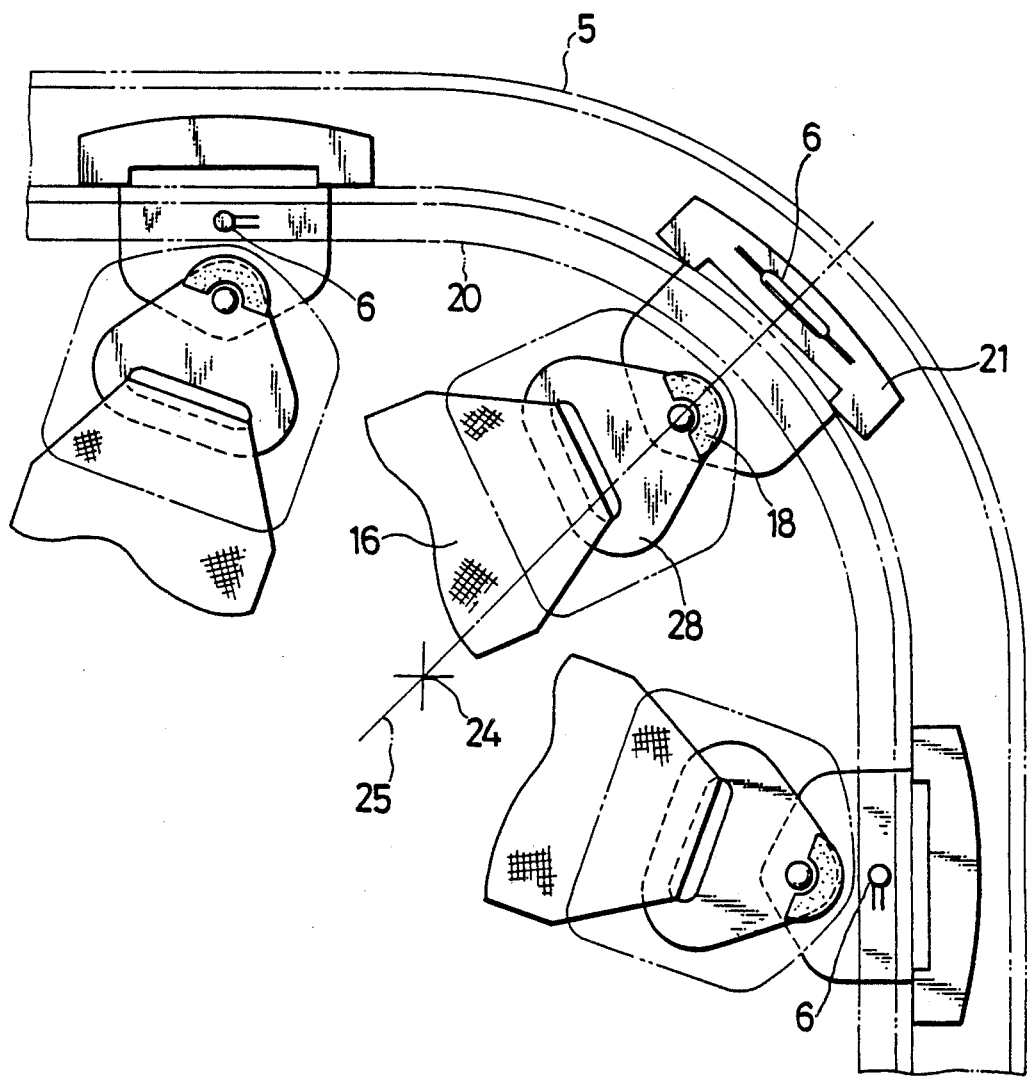
FIG. 16 is similar to FIG. 15 except that the tongue has been pivoted in the opposite direction.

FIG. 15 shows the magnetic sensor actuation system according to the ninth embodiment of the present invention, in which the webbing anchor portion 28 has been pivoted. FIG. 16 depicts the same magnetic sensor actuation system of the ninth embodiment, in which the webbing anchor portion 28 has been pivoted in the opposite direction to FIG. 15. The arrangement of the magnet 18 on the line 25 makes it possible to maintain constant the distance between the magnet 18 and the magnetic sensor 6 irrespective of the position of arrangement of the magnetic sensor 6 on the guide rail 5, namely, no matter whether the magnetic sensor 6 is arranged at a sharp bent section or a substantially straight section of the guide rail 5 or at a straight section of the guide rail 5 as shown in FIG. 14(a) or the webbing anchor portion 28 is pivoted as illustrated in FIG. 15. As a result, the magnetic sensor is actuated without failure, whereby its reliability has been enhanced.

FIGS. 17(a) through 17(d) illustrate a magnetic sensor actuation system according to a tenth embodiment of the present invention. This embodiment is of the pivotal ERB type. In the tenth embodiment of FIG. 18, an ERB 13 has been pivoted. In FIG. 19, the ERB 13 has been pivoted in the opposite direction to FIG. 18.

A magnet 18 is arranged to remain on the line 25 even when the ERB 13 is pivoted. A pin 29 about which the ERB 13 with the magnet 18 enclosed therein pivots is located substantially on the line 25.

Figure 17A:
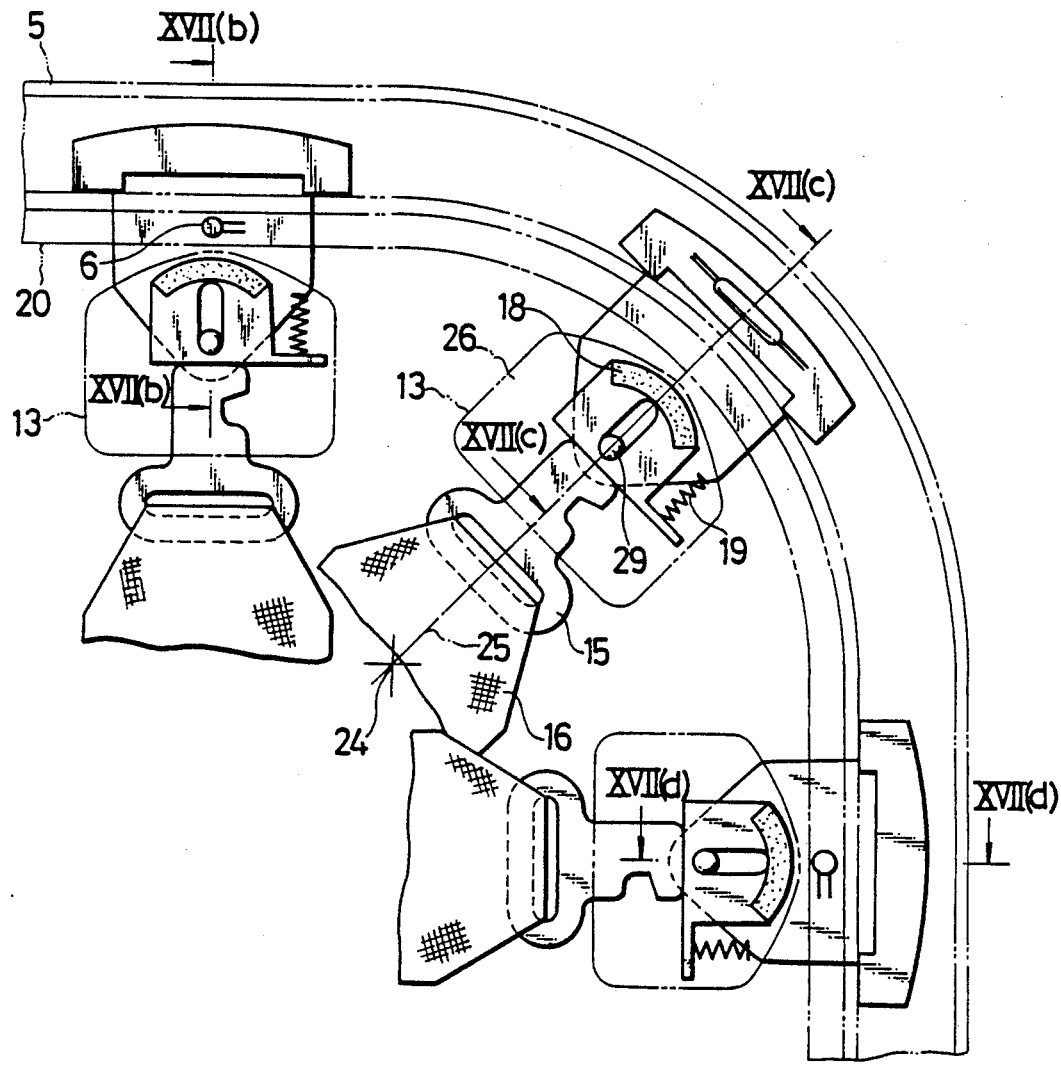
FIG. 17(a) shows a magnetic sensor actuation system according to a tenth embodiment of the present invention.
Figure 17B:
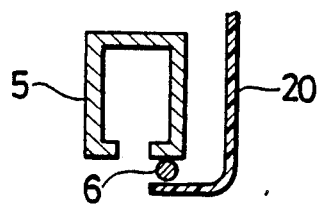
FIGS. 17(b) through 17(d) are cross-sectional views taken in the directions of arrows XVII(b)—XVII(b), XVII(c)—XVII(c) and XVII(d)—XVII(d) of FIG. 17(a), respectively.
Figure 17C:
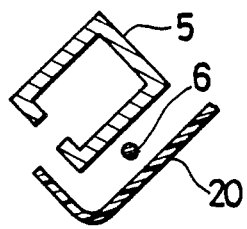
Figure 17D:
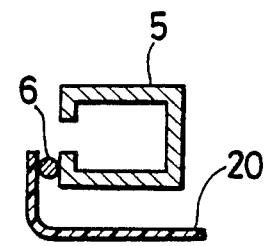
Figure 18:
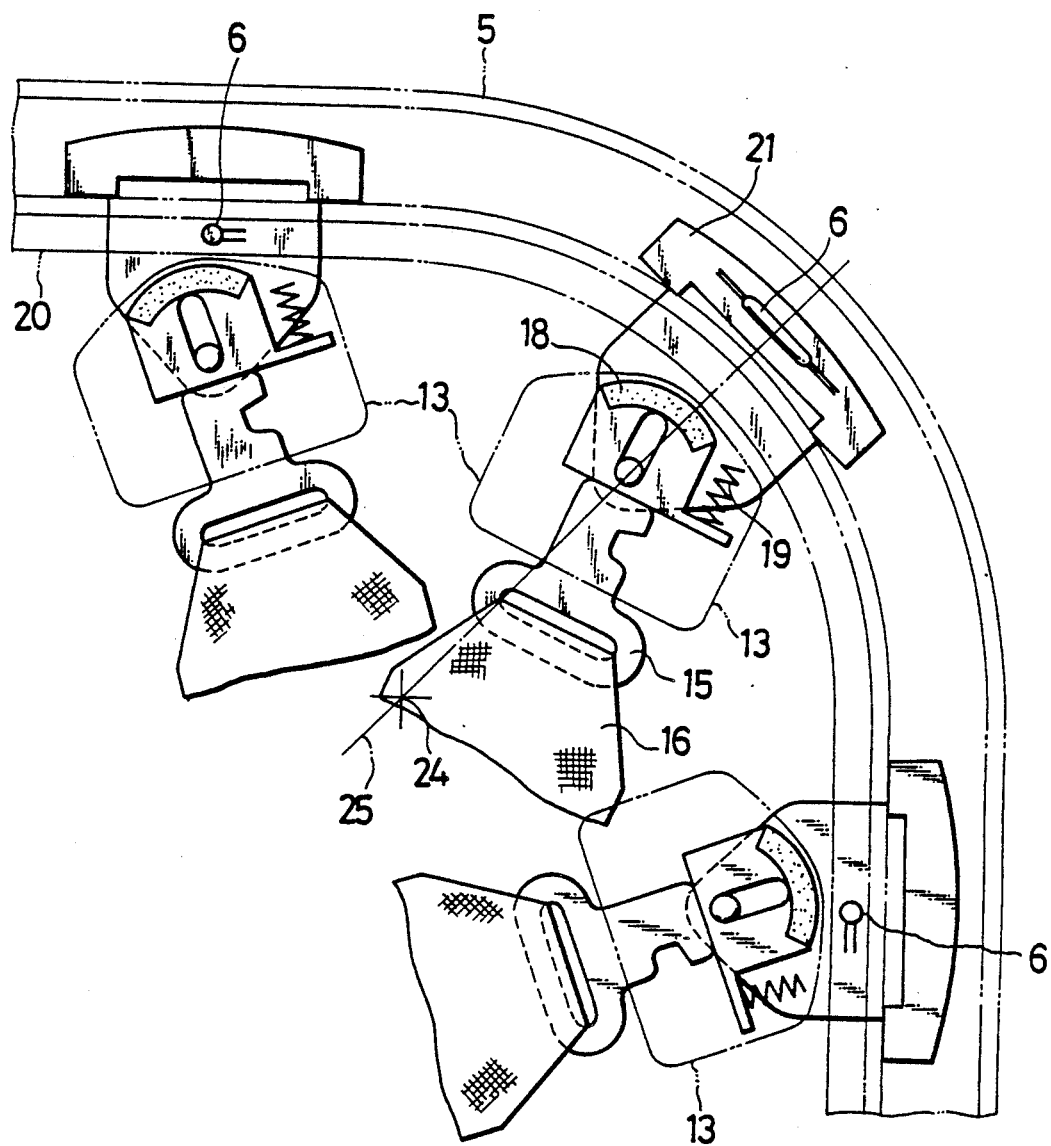
FIG. 18 is similar to FIG. 17(a) except that a tongue has been pivoted.
Figure 19:
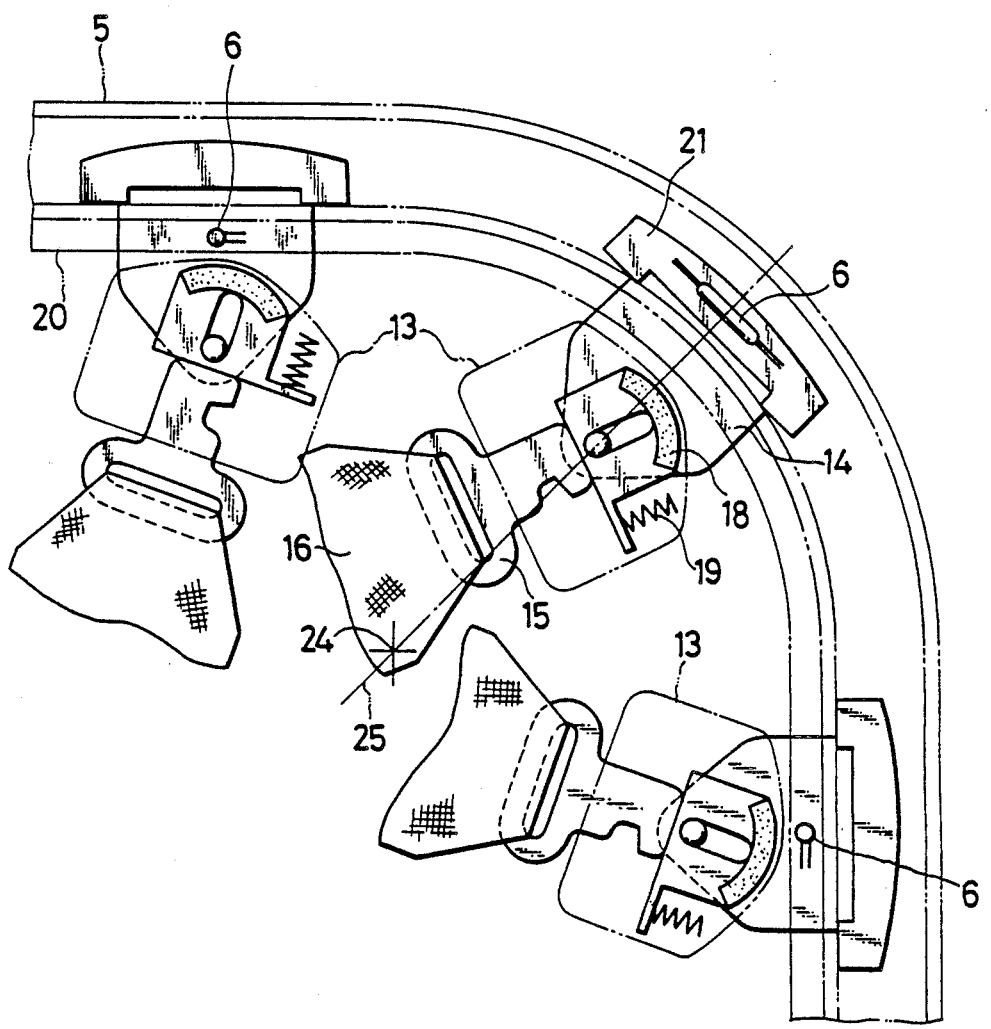
FIG. 19 is similar to FIG. 18 except that the tongue has been pivoted in the opposite direction.

The arrangement of the magnet 18 on the line 25 has made it possible to maintain the distance between the magnet 18 and the magnetic sensor 6 unchanged no matter whether the magnetic sensor 6 is arranged at a sharp bent section or a substantially straight section of the guide rail 5 or at a straight section of the guide rail 5 as shown in FIG. 17(a) or the ERB 13 is pivoted as illustrated in FIG. 18. As a result, the magnetic sensor is actuated without failure, whereby its reliability has been enhanced.

Figure 20:
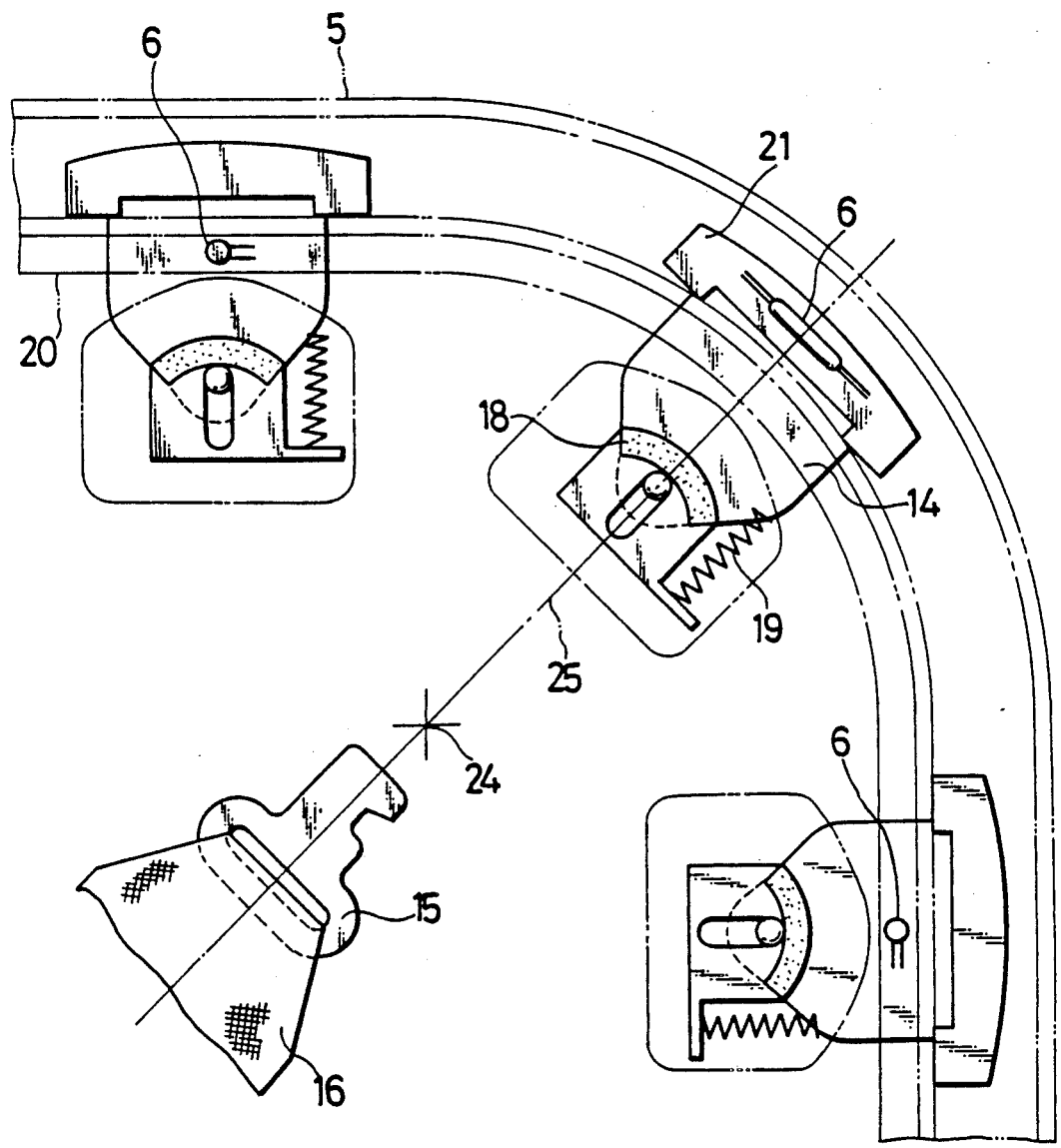
FIG. 20 is similar to FIG. 17(a) except that the tongue is out of latching engagement with a buckle.

FIG. 20 shows the magnetic sensor actuation system of FIGS. 17(a) through 19, in which the tongue is unlatched. The magnetic sensor 6 has not been actuated since there is a substantial distance between the magnetic sensor 6 and the magnet 18.

I claim:

1. In a magnetic sensor actuation system suitable for use in a passive seat belt system of the type that a slide anchor with a webbing carried thereon travels along a guide rail having at least one bent section, the improvement wherein the actuation system comprises at least one magnetic sensor provided near the guide rail and a magnet provided on the slide anchor to actuate the magnetic sensor; and upon actuation of the magnetic sensor, the magnet is located on a line extending between the center of turning movement of the slide anchor along the bent section of the guide rail and the midpoint of an area of contact between the slide anchor and the guide rail.

2. The actuation system of claim 1, wherein the slide anchor is brought into contact with the bent section of the guide rail at two points on the slide anchor, said two points being spaced from each other in the direction of movement of the slide anchor and the midpoint is a point dividing into two equal halves a line segment which extends between the two points.

3. The actuation system of claim 1, wherein the slide anchor is brought into contact with the bent section of the guide rail over a predetermined length of the slide anchor in the direction of movement of the slide anchor and the midpoint is a point dividing into two equal halves a curve which corresponds to the predetermined length.

4. The actuation system of claim 1, wherein the slide anchor is provided with a buckle for receiving a tongue fastened to one end of the webbing, the magnet is attached to the buckle and is movable between a first position where the tongue is latched in the buckle and a second position where the tongue and the buckle are out of latching engagement, and upon actuation of the magnetic sensor, the magnet is located at the first position.

5. The actuation system of claim 4, wherein the magnet is located on the line extending between the center of turning movement of the slide anchor and the midpoint of the area of contact when the magnet is at any one of the first and second positions.

6. The actuation system of claim 4, wherein the magnet is located off the line extending between the center of turning movement of the slide anchor and the midpoint of the area of contact when the magnet is at the second position.

7. The actuation system of claim 1, wherein the slide anchor is provided with a tongue which can be latched with a buckle fastened to one end of the webbing, and the magnet is attached to the buckle.

8. The actuation system of claim 7, wherein the magnet is fixed at a predetermined position of the buckle.

9. The actuation system of claim 1, wherein the webbing is fastened directly to the slide anchor and the magnet is fixed at a predetermined position of the slide anchor.

10. The actuation system of claim 1, wherein the slide anchor is in contact with the guide rail by way of rollers.

11. The actuation system of claim 1, wherein an webbing anchor with the webbing fastened at one end thereof is pivotally supported on the slide anchor and the magnet is attached to the webbing anchor.

12. The actuation system of claim 11, wherein the magnet has an arcuate configuration and is arranged about a pivot of the webbing anchor and on a side of the guide rail.

13. The actuation system of claim 1, wherein a buckle for receiving a tongue with the webbing fastened thereto is supported pivotally on the slide anchor and the magnet is attached to the buckle.

14. The actuation system of claim 13, wherein the magnet has an arcuate configuration and is arranged about a pivot of the buckle and on a side of the guide rail.

15. The actuation system of claim 13, wherein the magnet is movable between a first position which the magnet assumes while the tongue is latched in the buckle and a second position which the magnet assumes while the tongue is out of latching engagement with the buckle.

* * * * *